(No Model.)
G. P. WHITHORN.
CHURN.
No. 464,236. Patented Dec. 1, 1891.
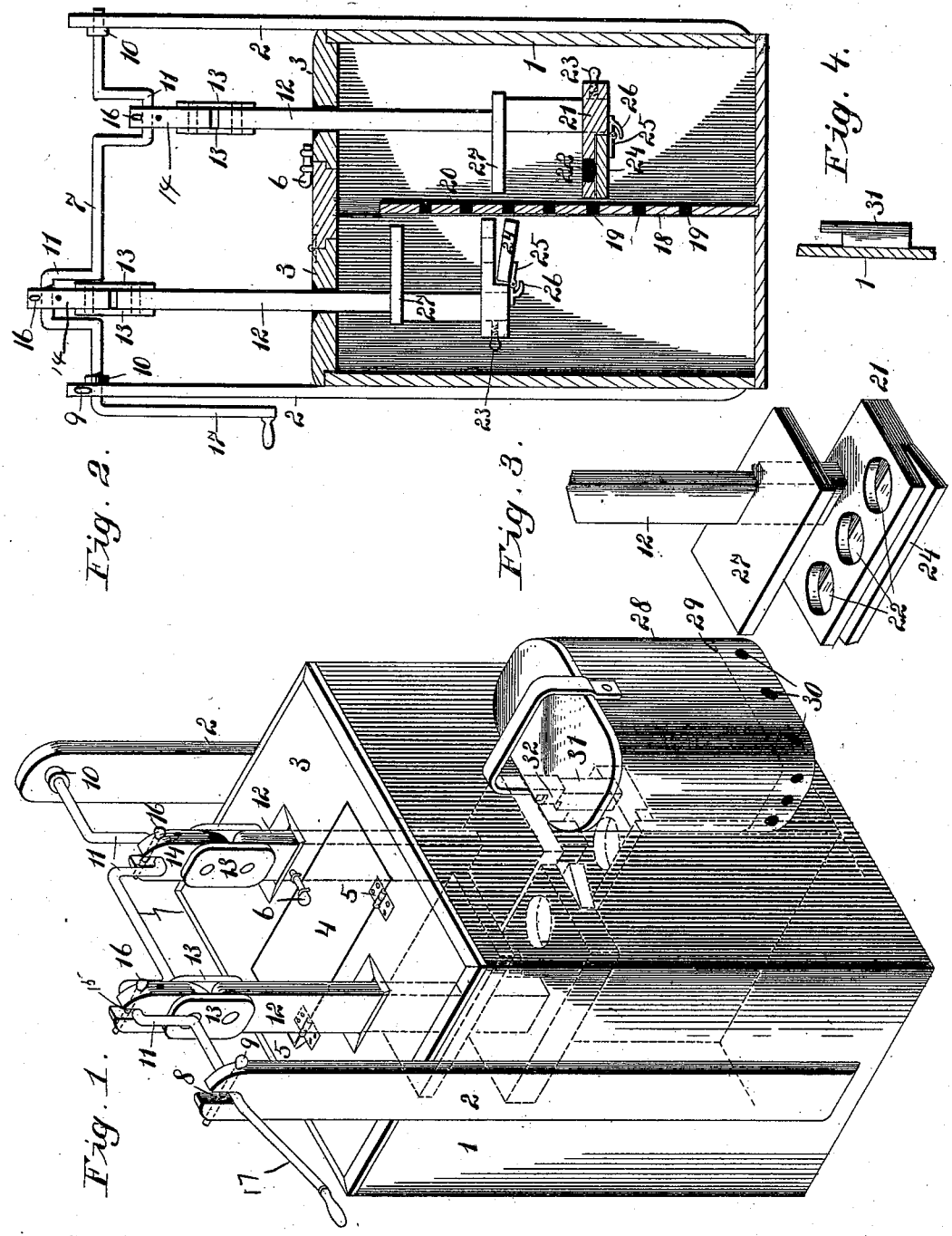
Witnesses:
Inventor:
Geo. P. Whithorn

UNITED STATES PATENT OFFICE.

GEORGE PRENTICE WHITHORN, OF EMPORIA, KANSAS.

CHURN.

SPECIFICATION forming part of Letters Patent No. 464,236, dated December 1, 1891.

Application filed May 7, 1891. Serial No. 391,941. (No model.)

*To all whom it may concern:*

Be it known that I, GEORGE PRENTICE WHITHORN, of Emporia, Lyon county, Kansas, have invented certain new and useful Improvements in Churns, of which the following is a full, clear, and exact description, reference being had to the accompanying drawings, forming a part hereof.

My invention relates to machines for producing butter from cream; and the objects of my invention are to produce a churn which will be simple, durable, and inexpensive in construction, and which shall thoroughly agitate the cream, and thereby produce butter in the shortest possible time and with the least amount of labor on the part of the operator; furthermore, to provide means for readily tempering the cream when the latter is either too warm or too cold, the said tempering device being readily attachable to and detachable from the churn.

To the above purposes my invention consists in certain peculiar and novel features of construction and arrangement, as hereinafter described and claimed.

In order that my invention may be fully understood, I will proceed to describe it, with reference to the accompanying drawings, in which—

Figure 1 is a perspective view of a churn constructed in accordance with my invention. Fig. 2 is a transverse vertical section of the same. Fig. 3 is a detached perspective view of the lower portion of one of the dasher-rods, showing its attached dashers. Fig. 4 is a detached view, partly in side elevation and partly in transverse vertical section, of the support for the tempering-receptacle.

In the said drawings, 1 designates the body of the churn, the said body being preferably of rectangular form, as shown, and 2 designates two uprights or standards which extend upward from the opposite sides of the churn-body, said standards being secured to said churn-body in any suitable or preferred manner.

3 designates the top of the churn-body, the said top being provided with a lid or cover 4, connected to the top by suitable hinges 5, and also provided with a suitable bolt or catch 6, which retains the lid in closed position. This lid serves as a means for affording convenient access to the interior of the churn for placing the cream in the churn, removing the butter therefrom, and for other obvious purposes.

7 designates a shaft, which is journaled in the upper ends of the standards 2, so as to extend horizontally across the top of the churn. The upper end of one of the standards is formed with an open bearing 8, in which one end of the shaft rests, a removable pin 9 extending transversely through the upper end of the standard above the shaft, and thus retaining the shaft in position while the churn is in use. At its ends the shaft 7 is formed with collars 10, which abut against the inner sides of the standards 2, and thus prevent endwise displacement of the shaft.

11 designates two crank-sections, which are formed in the shaft between the two standards 2, and which extend oppositely from each other.

12 designates the two dasher-rods, the upper end of each of which is pivotally connected to the two coupling-plates 13, and the upper ends of these two coupling-plates are in turn pivotally connected to the lower end of a bearing-block 14, the upper ends of said blocks being journaled upon the crank-sections, as will be presently explained. These dasher-rods are preferably of such length that the dashers come close to the bottom of the churn on their downstroke. The upper end of each of these bearing-blocks is formed with an open bearing 15, into which one of the crank-sections 11 is inserted, and a removable pin 16 extends transversely through the block above each of the cranks and serves to retain the crank in the recess. At one end the crank-shaft is provided with a crank-arm 17, by means of which the operator rotates the shaft to operate the dasher.

Within the churn-body is placed a removable vertical partition 18, which is of such height as to reach above the dashers when the latter are at the limit of their upstroke, which is formed with a number of holes 19, and being inserted into oppositely-disposed grooves formed vertically in the inner surface of two of the sides of the churn-body. To the lower end of each dasher-rod 12 is attached a dasher 21, which is preferably of rectangular form and which is provided with a number of holes 22. These dashers are each preferably connected to the dasher-rods 12 by a set-screw 23, the inner end of which impinges upon the lower end of the dasher-rod, thus permitting the dashers to be readily removed for cleaning or other purposes. To the under side of each dasher 21 is connected a valve 24, which is attached to the dasher by two or more hinges 25, said hinges being secured to the under side of the dasher and also to the under side of the valve. These valves occupy such a position that when in raised or closed position they close the holes 22 from beneath, and when open they incline downward toward the partition 18. The opening movements of the valves 24 are limited by suitable stops or lugs 26, formed, preferably, upon the under sides of the hinges and serving to prevent the valves from assuming a vertical position and turning backward from the perforated parts of the dashers. Immediately above each dasher 21 is mounted an auxiliary dasher 27, which preferably corresponds in size and form with the dasher 21. These auxiliary dashers are only used when an extraordinarily large amount of cream is to be churned, and when used the dashers 21 are adjusted closely upward beneath the auxiliary dashers 27.

28 designates a tempering-receptacle, which is used in connection with the churn. This device consists of a sheet-metal receptacle 28, the bottom 29 of which sets upward within the lower end of the receptacle and the lower portion of the sides of the receptacle below the bottom 29 is formed with a number of holes 30. A bracket or support 31 is formed on one side of the churn-body 1, and the upper end of this bracket is formed to enter a loop or ring 32 on the receptacle.

From the above it will be seen that as each dasher descends the valve closes and forces the cream through the holes 19 of the partition 18. Then as the dasher rises the valve falls into its inclined open condition and again forces the cream through said openings. As these actions occur alternately at opposite sides of the partition, the cream is kept constantly agitated and is thrown alternately back and forth through the perforated partition 18, the fatty globules of the cream being thus quickly broken up, and the butter is produced with the utmost rapidity. If the cream be too warm for churning, the tempering-receptacle is filled with cold water and placed in the churn, thus being immersed in the cream therein, the partition being removed from the churn. If the cream is too cold for churning, the receptacle is filled with warm water and is similarly immersed in the cream in the churn. In either case the cream comes into direct contact with the sides and bottom of the receptacle, the holes in the lower part of the sides permitting this latter contact, and the cream is thus quickly and thoroughly tempered. After this tempering the receptacle is removed and attached to its bracket and the partition and crank-shaft are placed in position for churning.

It will thus be seen that the machine is simple, durable, and comparatively inexpensive in construction, that it is easily operated, and readily kept sweet and clean.

Having thus described my invention, what I claim as new therein, and desire to secure by Letters Patent, is—

An improved churn comprising a body or receptacle having a pair of oppositely-disposed internal grooves arranged vertically in its sides, a perforated partition set removably in said grooves, a pair of standards extending vertically upward from said body or receptacle and having respectively a closed and an open bearing in their upper ends, a crank-shaft having two crank-sections and journaled in said bearings, a cross-pin passing through the open bearing and retaining the shaft in position therein, a pair of bearing-blocks connected by open journals with said crank-sections and retained upon said sections by cross-pins, a pair of dasher-rods pivotally connected by links with said bearing-blocks, a perforated dasher removably connected to said dasher-rods and retained thereon by set-screws, a pair of auxiliary dashers located above the perforated dashers, and valves hinged beneath the perforated dashers and moving upwardly against the perforated parts of said dashers and provided with hinges having lugs or stops for limiting the downward movements of the dashers, substantially as set forth.

In testimony whereof I affix my signature in presence of two witnesses.

GEORGE PRENTICE WHITHORN.

Witnesses:
ISAAC NEWELL,
JOSEPH F. CULVER.